United States Patent [19]

Wrench

[11] 4,239,343
[45] Dec. 16, 1980

[54] ACTUATOR CONFIGURATION FOR A DEFORMABLE MIRROR

[75] Inventor: Edwin H. Wrench, La Jolla, Calif.

[73] Assignee: General Dynamics Corporation, San Diego, Calif.

[21] Appl. No.: 72,463

[22] Filed: Sep. 4, 1979

[51] Int. Cl.³ .................................................. G02B 5/10
[52] U.S. Cl. .................................... 350/295; 350/285; 350/310
[58] Field of Search ........................ 350/285, 295, 310

[56] References Cited

PUBLICATIONS

Hardy, "Active Optics: A New Technology for the Control of Light", *Proceedings of the IEEE*, vol. 66, No. 6, Jun. 1978, pp. 651–697.

*Primary Examiner*—F. L. Evans
*Attorney, Agent, or Firm*—John R. Duncan; Frank D. Gilliam

[57] ABSTRACT

A light deflector apparatus comprising a bimorph piezoelectric backplate combined with an array of spherical linear piezoelectric actuators for supporting a mirrored faceplate for electrically controlled changes in the spherical radius and the focal length as well as localized variations on the surface of the mirror. The bimorph backplate forms part of a supporting structure including a bellows which, with the backplate and faceplate, form a chamber to contain the spherical actuators and which is partially evacuated to hold the faceplate in engagement with the spherical actuators.

7 Claims, 6 Drawing Figures

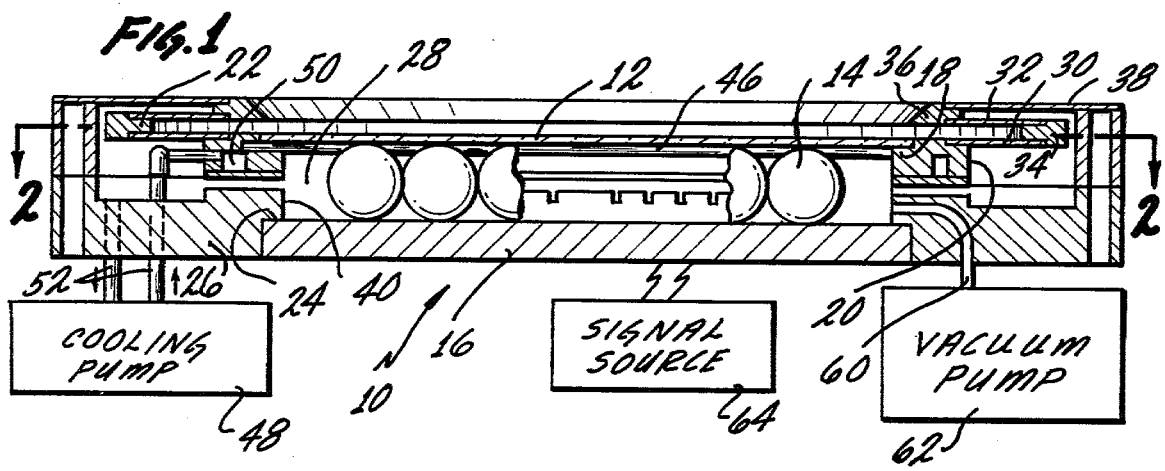
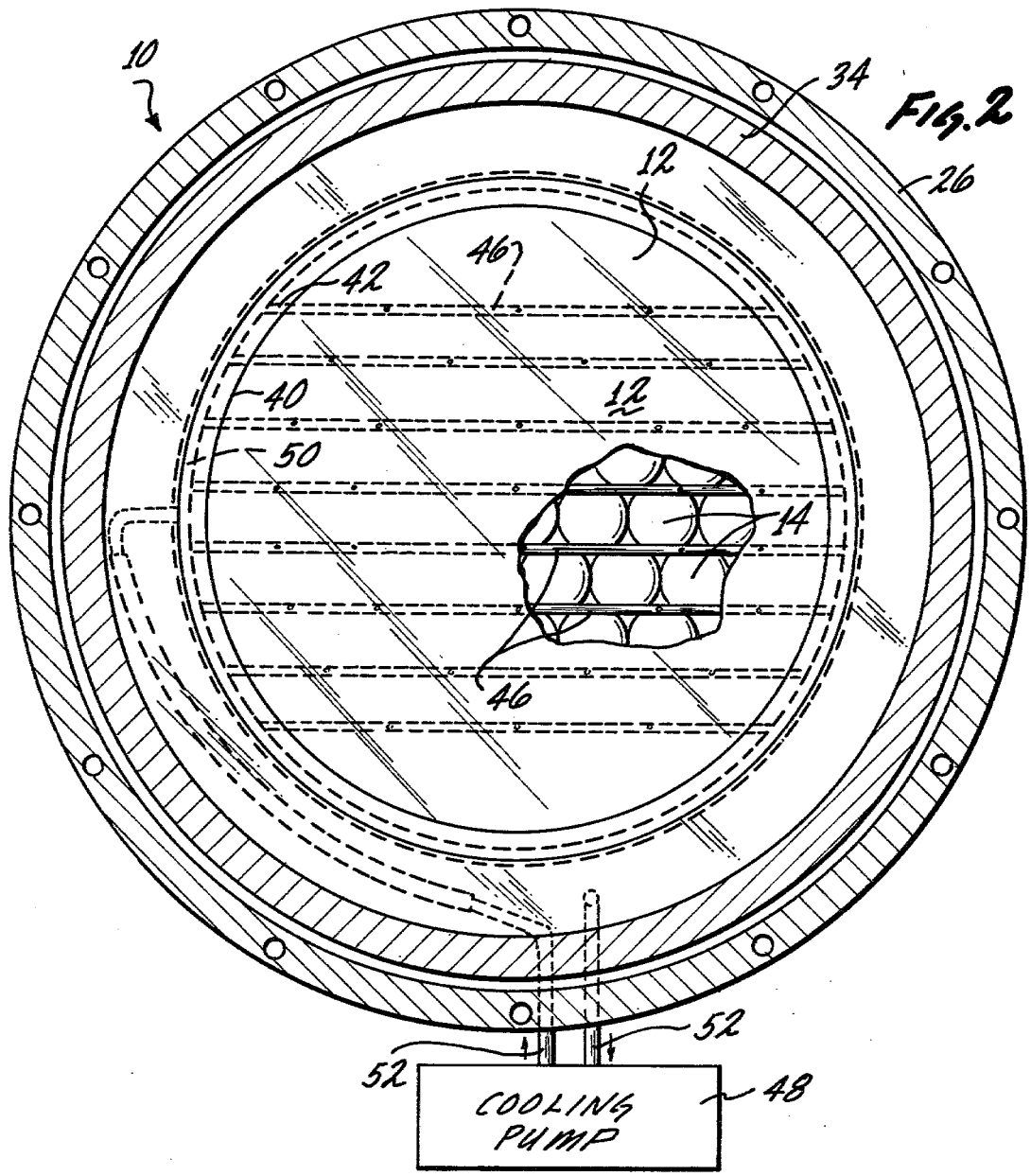

ACTUATOR CONFIGURATION FOR A DEFORMABLE MIRROR

BACKGROUND OF THE INVENTION

This invention relates to light deflectors of the type having a mirror which is deformable by piezoelectric actuators for deflecting light beams.

In the prior art, there are a variety of piezoelectrically actuated light deflectors, such as shown in the U.S. Pats., to Thaxter No. 3,758,199, to Fowler et al, No. 3,544,201, and to Feinleib, No. 3,904,274.

The deformable mirrors in the foregoing prior art use either linear stacks of piezoelectric crystals or single linear piezoelectric slab, and require a rigid attachment of the actuators to the mirrors in order to exert pressure and tension on the face of the mirror. This rigid attachment causes unwanted side loads and/or unwanted slope changes on the face of the mirror.

Accordingly, it is an object of this invention to provide a piezoelectrically actuated deformable mirror which is not rigidly attached to the piezoelectric actuators and avoids unwanted side loads and unwanted slope changes on the face of the mirror.

Still another object of this invention is to improve prior art by providing a system which permits controlled variations in the overall face of a deformable mirror, or in any local area of the mirror.

SUMMARY OF THE INVENTION

The invention which accomplishes the foregoing object comprises a bimorph piezoelectric backplate combined with an array of spherical (or spherically ended) linear piezoelectric crystals (actuators) supporting a mirrored faceplate. The bimorph backplate forms part of a suporting structure which includes a bellows for movably supporting the mirrored faceplate at its edges and for sealing a chamber between the mirrored faceplate and backplate which contains the spherical piezoelectric actuators. The chamber is partially evacuated to hold the mirrored faceplate in tangential engagement with the spherical actuators and means are provided for controlling the temperature of the mirrored faceplate. The bimorph backup plate permits large changes in the spherical radius and focal length of the mirror while the spherical actuators permit relativelly small variations in a local surface of the mirror.

Since the mirrored faceplate rests tangentially against the linear actuators and is held in place only on the edges thereof by the partial vacuum in the chamber, several advantages ensue including,
the elimination of sideloads introduced into the mirrored surface by the prior art actuators, unidirectional operations of the actuators eliminating the possibility of depoling the crystals,
a reduction in the thickness of the assembly possibly as much as two thirds of the thickness of the prior art assemblies,
simplification in actuator complexity and installation provisions, and
a sizeable weight reduction savings in the backup structure.

While bimorph motor drivers and spherical components have been used in optical mirror systems in the prior art such as shown for example in the U.S. Pat. to Elliott, No. 3,794,410 and in the U.S. Pat. to Tschunko, No. 3,540,802, none have used a bimorph backup plate or spherical piezoelectric actuators in the manner disclosed herein to accomplish the foregoing advantages.

BRIEF DESCRIPTION OF THE DRAWINGS

FIG. 1 is a elevational view of the actuator system for a light deflecting deformable mirror in cross section, to show the details thereof, FIG. 2 is a plan view, partially broken away, taken along line 2—2 of FIG. 1.

BRIEF DESCRIPTION OF THE PREFERRED EMBODIMENT

Figure 3:
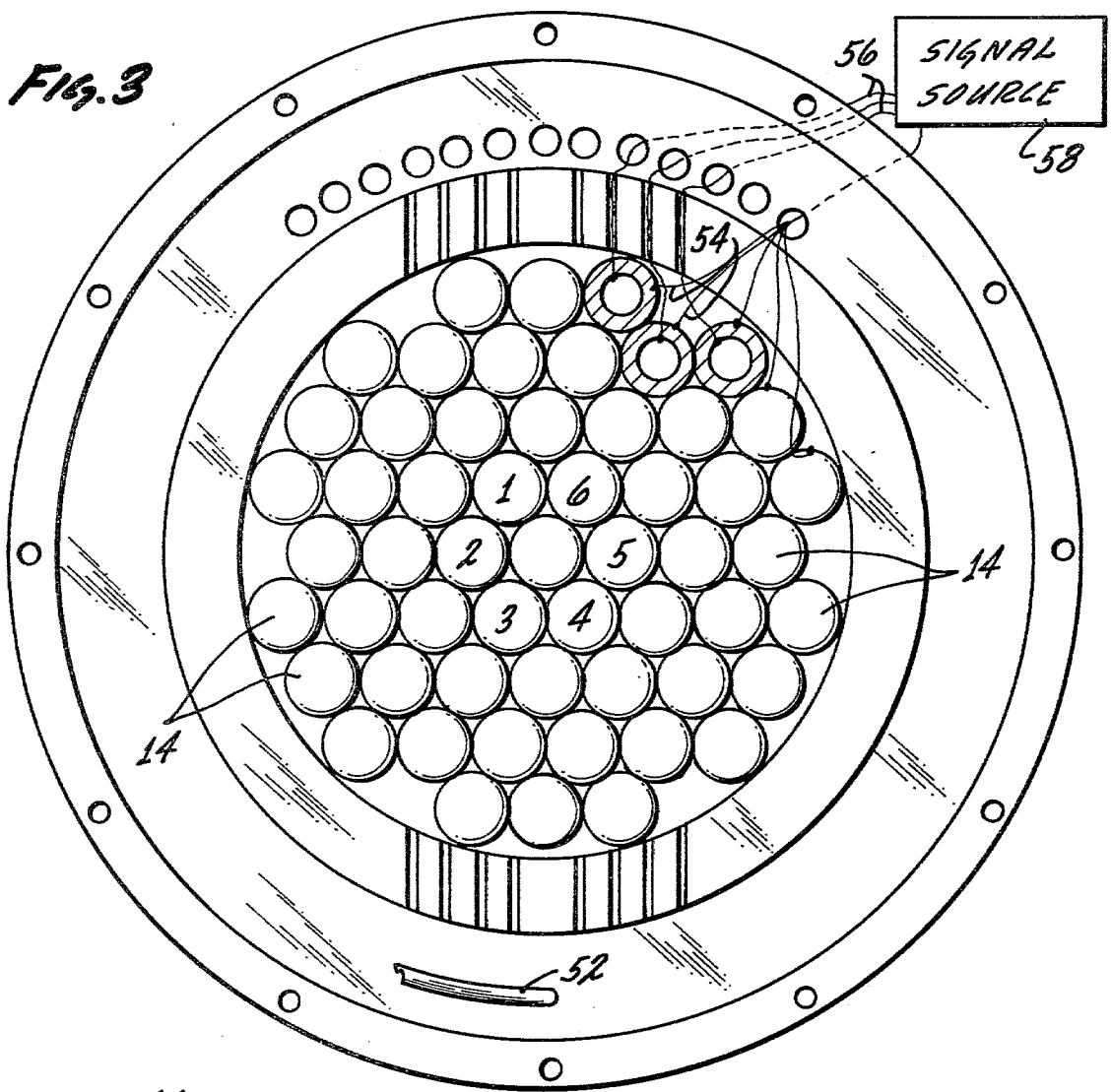
FIG. 3 is a plan view, like FIG. 2, but showing the spherical piezoelectric actuators in more detail.

The light deflecting deformable mirror assembly 10 as shown in the drawings, comprises essentially a deformable, moveable, mirrored faceplate 12, a plurality of spherical, or spherically ended, hollow piezoelectric crystals 14, forming an array of actuators, for moving the mirrored faceplate, and a bimorph piezoelectric backplate 16 also forming an actuator for the mirrored faceplate.

The disc-shaped mirrored faceplate 12 is supported on its edge in a ledge 18 of a moveable ring 20 which forms part of a bellows 22 while the bimorph backplate 14 seats in a ledge 24 of a larger, thicker outer ring 26. The ring 26 functions as a supporting structure for the entire assembly. The mirrored faceplate, bellows and supporting structure form a sealed chamber 28 which is partially evacuated to cause the mirrored faceplate to engage the spherical actuators tangentially and be supported thereby. The bellows permits movement of the mirrored faceplate towards the actuators.

The bellows 22, in addition to the aforementioned ring 20 supporting the outer edge of the mirrored faceplate, comprises a pair of relatively thin bendable rings 30 and 32 which extend radially outwardly from the ring 20 and are separated by a relatively thin freely moveable ring 34. The two rings 30 and 34 support the thin outer ring 34 for freedom of movement. To form the bellows, the first thin ring 30 engages the inner ring 20 at its outer edge and the outer ring 30 on its inner edge while the thin ring 32 engages the thin ring 34 on its upper edge while the inner edge of the thin ring engages a third ring 36 which is beveled on its radially inner side to prevent interference of any light beams directed towards the mirrored faceplate. Finally, a third thin ring 38 engages the beveled ring 36 and the upper edge of the supporting structure. This latter ring actually forms a wall for the evacuated chamber 28.

Figure 4:
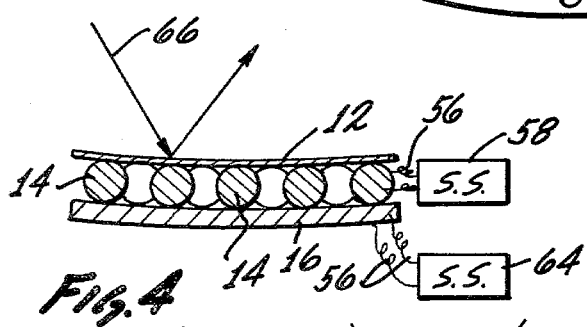
FIGS. 4, 5, and 6 are exaggerated schematic illustrations of the operation of the bimorph backup plate and the spherical piezoelectric actuators.
Figure 6:
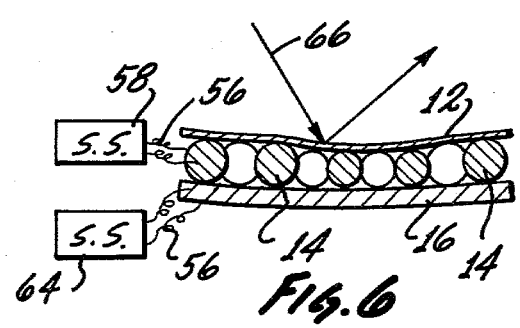
Figure 5:
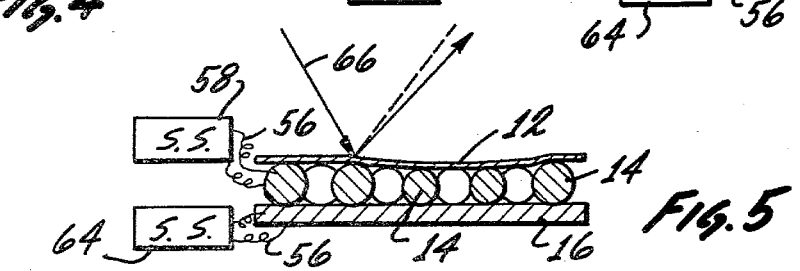

The supporting structure forms a large ring portion 40 having an inner radius of a size to maintain the spherical actuators 12 in engagement with one another, while ring 20 has transverse grooves 42 to support relatively thin-walled copper tubings 46 in the space between the upper spherical surfaces of the spherical actuators. The copper tubings 46 are apertured and connected to a source of coolant 48 through a circular groove 50 in ring 20 and by way of inlet 6 return conduits 52 in outer ring 26. The coolant maintains the deformable mirror at a controlled temperature. Bores 54 accomodate conductors 56 which are connected to the spherical actuators and to a suitable signal source 58 (FIGS. 4–6). As shown the connection to the outer surface of the conductors has a common feed through connection while the inner surfaces each have their own separate connection through-hole in the actuators. The surface area of the actuators where the through-holes are located do not engage either the bimorph backing plate or mirror plate. Too, a suitable bore 60 is provided in the supporting structure 26 to connect the chamber 28 to a suitable vacuum pump 62 for providing partial vacuum to the chamber. Finally, the bimorph backup plate is connected to a signal source 64 for actuation of this plate separate from the spherical actuators.

Thus, with the piezoelectric spherical actuators 12 connected to signal source 58 and with the piezoelectric bimorph backing plate 16 also connected to a signal source 64 and with the mirrored backplate held in engagement with the spherical actuators, the combination of the bimorph backplate and spherical actuators permit changes in the mirrored surface 12. The backup structure permits large changes in the spherical radius and focal length of the mirror while the spherical actuators permit a relatively local variations in the mirrored surface. This is shown in an exaggerated manner with the radiant beam 66 being deflected thereby in FIGS. 4, 5 and 6. FIG. 4 shows the large variation in the spherical radius of the mirror while FIG. 5 represents the variation in the mirror due to the spherical actuators alone. FIG. 6, on the other hand, shows the combination of an actuation of the backup plate and only a few of the spherical actuators to provide a local variation in the mirrored surface as well as overall large variation in the spherical radius of the mirror. This, the local variation could be accomplished, by, for example selecting only six of the spherical actuators such as identified by numbers 1-6 in FIG. 3.

From the foregoing it can be seen that since the mirrored faceplate rests against the spherical linear actuators and is held in place by the partial vacuum in the chamber and supported only on the edges by the bellows, that sideloads on the mirror have been virtually eliminated and that there is a reducation in the thickness of the assembly as well as a simplification in complexity and installation provisions over the prior art. Too, a sizeable weight reduction savings in the backup structure is accomplished and the unidirectional operation of the spherical actuators eliminates the possibility of depoling the crystals.

What is claimed is:

1. A deformable mirror for use in an optical system to displace a radiant beam, comprising:
   a bimorph piezoelectric actuator backplate,
   an array of piezoelectric linear actuators supported on said backplate and having spherical surfaces,
   a mirrored faceplate,
   means for holding said mirrored faceplate against said spherical surfaces, and
   means for applying electrical signals to said actuators to deform said mirrored faceplate.

2. The deformable mirror as claimed in claim 1 wherein said means for holding said mirrored faceplate against said spherical surfaces comprises vacuum means.

3. The deformable mirror as claimed in claim 1 wherein said means for applying electrical signals to said actuators comprises means connecting each said actuators with spherical surfaces to a signal source.

4. The deformable mirror as claimed in claim 1 wherein said means for applying electrical signals to said actuators comprises means connecting said actuators with spherical surfaces and said backplate to signal source means and wherein said signal source means may apply said signals to either said actuators with spherical surfaces or said backplate or to both said actuators with spherical surfaces and said backplate.

5. The deformable mirror as claimed in claim 1 further including means for cooling said faceplate.

6. The deformable mirror as claimed in claim 1 wherein said backplate forms part of a supporting structure,
   bellow means on said supporting structure,
   said bellow means supporting said mirrored faceplate,
   said faceplate, backplate and bellows defining a chamber,
   said actuators with spherical surfaces being located in said chamber,
   and wherein said means for holding said deformable faceplate against said spherical surfaces comprises means for providing a vacuum in said chamber.

7. A deformable mirror for use in an optical system to displace a radiant beam comprising,
   a bimorph piezoelectric actuator backplate,
   means for connecting said backplate to a signal source,
   an array of piezoelectric linear actuators supported on said backplate and having spherical surfaces,
   means for connecting said actuators with spherical surfaces to a signal source,
   a mirrored faceplate,
   means for holding said faceplate in engagement with said spherical surfaces, whereby the signals applied to said backplate cause said mirror to deform throughout and whereby signals applied to some of said linear actuators cause said faceplate to deform in local areas.

* * * * *